United States Patent [19]

Joss et al.

[11] E Patent Number: Re. 32,751

[45] Reissued Date of Patent: Sep. 20, 1988

[54] STICK VACUUM CLEANER

[75] Inventors: Michael S. Joss, Chicago, Ill.; David E. McDowell, Grand Rapids, Mich.

[73] Assignee: Bissell Inc., Grand Rapids, Mich.

[21] Appl. No.: 96,349

[22] Filed: Sep. 11, 1987

Related U.S. Patent Documents

Reissue of:

[64] Patent No.: 4,644,605
Issued: Feb. 24, 1987
Appl. No.: 715,324
Filed: Mar. 25, 1985

[51] Int. Cl.[4] ..... A47L 5/28

[52] U.S. Cl. ..... 15/329; 15/344; 15/350; 15/352; 15/410

[58] Field of Search ..... 15/329, 350, 351, 352, 15/344, 410

[56] References Cited

U.S. PATENT DOCUMENTS

| | | | |
|---|---|---|---|
| 1,558,006 | 10/1925 | Fisker | 15/344 |
| 2,191,348 | 2/1940 | Lauterbach | 15/143 X |
| 2,460,236 | 1/1949 | Osborn | 306/10 |
| 2,564,339 | 8/1951 | Nerheim | 15/344 X |
| 2,821,258 | 1/1958 | Benson et al. | 180/19 |
| 3,040,362 | 6/1962 | Krammes | 15/320 |
| 3,193,992 | 7/1965 | Findley et al. | 55/367 |
| 3,203,707 | 8/1965 | Anderson | 280/47.37 |
| 3,204,272 | 9/1965 | Greene et al. | 15/49 |
| 3,631,559 | 1/1972 | Gaudry et al. | 15/144 |
| 3,667,084 | 6/1972 | Valbona et al. | 15/323 |
| 3,673,628 | 7/1972 | Gaudry et al. | 15/143 A |
| 3,758,914 | 9/1973 | Nupp et al. | 15/329 |
| 3,977,037 | 8/1979 | Miyake et al. | 15/352 X |
| 4,209,875 | 7/1980 | Pugh et al. | 15/344 |
| 4,380,845 | 4/1983 | Miller et al. | 15/344 |
| 4,381,766 | 5/1983 | Avolio | 15/143 R X |
| 4,467,493 | 8/1984 | Buchtel | 15/323 |

FOREIGN PATENT DOCUMENTS

| | | | |
|---|---|---|---|
| 398849 | 7/1924 | Fed. Rep. of Germany | 15/410 |

*Primary Examiner*—Chris K. Moore
*Attorney, Agent, or Firm*—Price, Heneveld, Cooper, DeWitt & Litton

[57] ABSTRACT

A vacuum cleaner convertible between an upright vacuum cleaner and a portable hand carried vacuum cleaner. The conversion is accomplished by means of a handle pivotally mounted for selective movement between an open position extending from the body of the unit for manipulation thereof in an upright floor carried vacuum operation, and a closed position overlying the body of the unit wherein the handle and housing cooperate to form a handgrip of discrete length for manipulation thereof in a portable hand carried vacuum cleaning operation. The handle automatically latches upon opening and closing. The vacuum cleaner also includes a dirt reservoir and filter bag assembly carried by the body of the unit and removable from the body of the unit and separable from each other for ease of cleaning.

13 Claims, 3 Drawing Sheets

STICK VACUUM CLEANER

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to vacuum cleaners and more particularly to a vacuum cleaner convertible between an upright unit and a portable hand carried unit.

The conventional upright vacuum cleaner is provided with a housing or body having a nozzle means at its lower end and a handle mounted on its upper end extending from the housing for manipulating the vacuum cleaner in an upright manner along the floor to be cleaned. Examples of such vacuum cleaners can be found in Valbona et al U.S. Pat. No. 3,667,085 and Findley et al, U.S. Pat. No. 3,193,992. Additionally, Fisker, U.S. Pat. No. 1,558,006 illustrates an upright vacuum cleaner provided with a handle pivotally connected to the body of the unit so that it may be swung into a position alongside of the body of the vacuum cleaner during transport or storage.

Recently, small portable lightweight vacuum cleaners adapted to be hand carried have been developed. These types of vacuum cleaners are generally cordless, battery powered electric driven units which inclue a removable section to permit insertion, removal and replacement of a filter bag. Illustrative of these types of vacuum cleaners are Pugh et al, U.S. Pat. No. 4,209,875 and Miller et al U.S. Pat. No. 4,380,845.

Additionally, Nupp et al, U.S. Pat. No. 3,758,914 illustrates a vacuum cleaner that is convertible between an upright vacuum cleaner and a portable hand carried vacuum cleaner. The Nupp et al patent also includes a removable dirt box and a handle which is rotatable between an extended position and a retracted position overlying the dirt box. A number of different forms of vacuum cleaners have been developed wherein dirt boxes or other components of the vacuum cleaner are removable from the body of the unit. Illustrative of such vacuum cleaner structures are those shown in Nerheim, U.S. Pat. No. 2,564,339; Krammes, U.S. Pat. No. 3,040,362; and Buchtel, U.S. Pat. No. 4,467,493.

A number of different forms of connections between the handle and body of cleaning devices have also been developed. For example, the above Fisker patent shows a handle pivotally connected to the body of a vacuum cleaner which may be adjusted and secured to various positions by a butterfly or wing nut. Osborn, U.S. Pat. No. 2,460,236 illustrates a handle for a vacuum cleaner which includes a mechanism similar to a "dead man" switch in that whenever a trigger on the handle is squeezed the handle may be freely pivoted on the body of the vacuum cleaner, and whenever the trigger is released the handle is locked in position. Lauderbach, U.S. Pat. No. 2,191,348 illustrates a two section handle for a dust mop or broom that includes a breakaway type latching mechanism between the two handle sections.

Furthermore, a number of different forms of push type operating handles for various devices have been developed that may be folded or collapsed to provide a carrying handle for the device. Gaudry et al, U.S. Pat. Nos. 3,631,559 and 3,673,628 as well as Anderson, U.S. Pat. No. 3,203,707 and Greene et al, U.S. Pat. No. 3,204,272 all relate to foldable handles for floor waxers or polishers. Benson et al, U.S. Pat. No. 2,821,258 relates to a foldable handle assembly for a power driven lawn mower while Avolio, U.S. Pat. No. 4,381,766 discloses a foldable applicator which enables persons to reach their backs to apply lotions, creams, oils and the like.

In designing a multipurpose vacuum cleaner of improved construction, problems are always found relative to the placement and mounting of the various components. This is especially true in connection with the handle assembly, as well as the dirt receptacle and filter bag assembly. It is important that the vacuum cleaner be designed so that it can be manufactured economically, as well as be assembled and serviced with a minimum of difficulty. Also, it is important that the dirt receptacle and filter bag assembly be easily removable and reinsertable to permit cleaning of the filter bag and disposal of the collected dirt. Thus, the elements of the vacuum cleaner should cooperate and function in an efficient manner, keeping in mind the need for a compact unit which is visually attractive.

It is therefore a task of the present invention to provide a vacuum cleaner of improved construction which is convertible between an upright vacuum cleaner and a hand carried portable vacuum cleaner wherein the various components cooperate and function in an efficient manner.

It is another task of the invention to provide a convertible vacuum cleaner that is lightweight, easy to clean and visually attractive.

In accordance with one aspect of the invention, a vacuum cleaner is provided that is convertible between an upright vacuum cleaner and a portable hand carried vacuum cleaner that includes a handle pivotally mounted on the body of the unit for selective movement between an open position extending from the body for manipulation thereof in an upright floor carried vacuum cleaning operation, and a closed position overlying the body of the unit wherein the handle and housing cooperate to form a hand grip of discrete length for manipulation thereof in a portable hand carried vacuum cleaning operation. More specifically, the body of the unit includes a recess which provides a hand hold space between the handle and the body of the unit to form the grip when the handle is in its closed position. Thus, the handle enables the unit to be readily converted from an upright vacuum cleaner to a portable hand carried vacuum cleaner.

In accordance with another aspect of the invention, the handle of the vacuum cleaner includes locking means for automatically locking the handle in position upon opening to its upright position and upon closing to its hand held portable position. The handle locking means includes a "breakaway" type latch which normally restrains the handle from pivotal movement out of its open position except upon the application of a predetermined external bending force on the handle. The locking means also includes a latch for the handle when it is closed which is located on the door of the dirt receptacle and filter bag assembly rather than on the cleaner body. This prevents removal of the dirt receptacle and filter bag assembly when the handle is in its closed position. Thus, removal of the dirt receptacle and filter bag assembly is only permitted after movement of the handle from its closed position to its open extended position.

In still another aspect of the invention, the dirt receptacle and filter bag assembly is separable from the body of the unit and from each other for easy cleaning. This assembly includes a cover which forms a portion of the body of the unit and a dirt receptacle or reservoir integrally attached thereto which is receivable within a hollow portion of the body of the unit. The filter bag is attached to a frame which is slidable onto one end of the dirt reservoir and sealingly held in place in an air tight relationship when the cover is latched on the cleaner body.

The present invention thus provides an improved construction for a vacuum cleaner convertible between upright operation and portable hand held operation.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
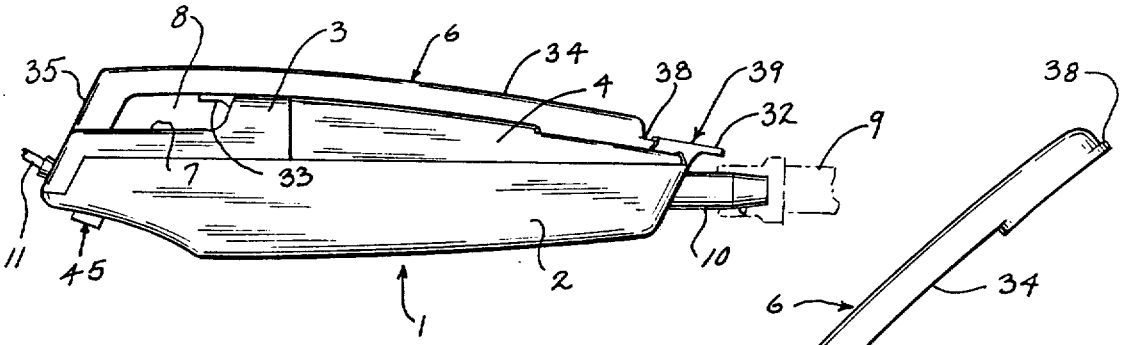
FIG. 1 is a side view in elevation of a vacuum cleaner embodying the invention with its handle closed and arranged as a portable hand carried vacuum cleaner.
Figure 2:
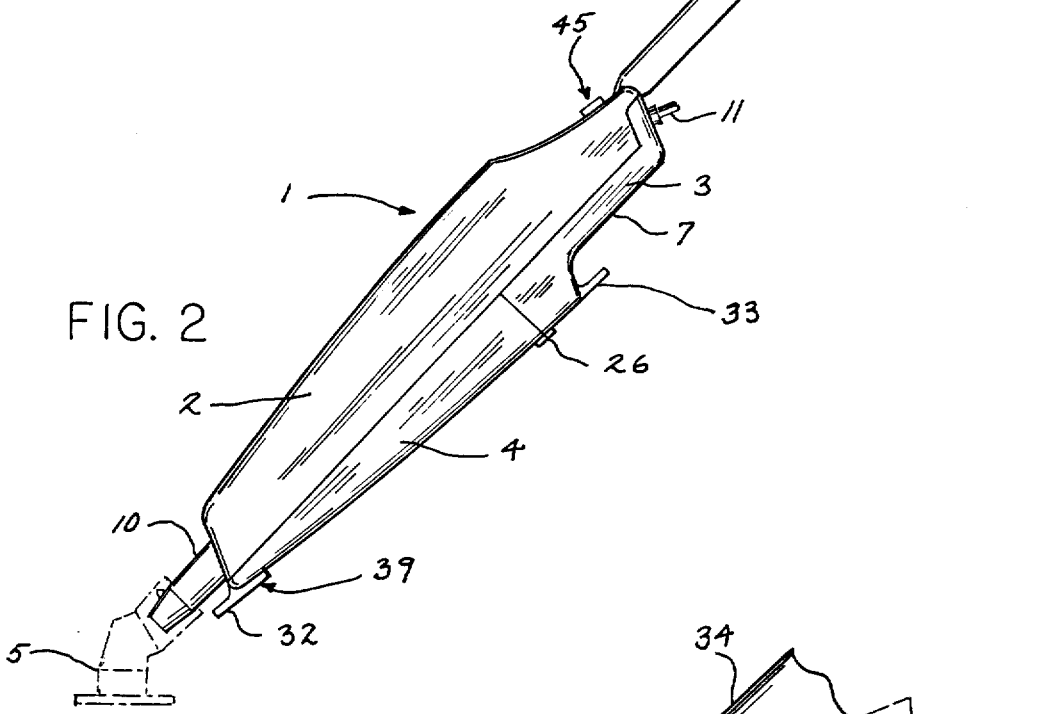
FIG. 2 is a side view in elevation of the vacuum cleaner of FIG. 1 with its handle in the extended open position and arranged as an upright floor carried vacuum cleaner.

Referring now to the drawings, FIGS. 1 and 2 illustrate a vacuum cleaner generally designated by the numeral 1 constructed in accordance with the principles of the present invention. As shown best in FIG. 8, however, vacuum cleaner 1 includes a U-shaped body or housing 2 enclosed at its upper end by a motor housing cover 3 and at its lower end by a door or cover 4 for the filter bag and dirt reservoir assembly which will hereinafter be described. Vacuum cleaner 1 is provided at its lower end with a nozzle 5, and at its upper end with a handle 6 for use in manipulating cleaner 1 in a vacuum cleaning operation. Handle 6 is pivotally mounted on the upper end of body 2 for selected movement between an open position extending from body 2 (FIG. 2) for manipulating vacuum cleaner 1 in an upright floor carried vacuum cleaning operation, and a closed position (FIG. 1) overlying body 2 and in abutment therewith wherein vacuum cleaner 1 is converted into a portable hand carried vacuum cleaner. In this latter position handle 6 and motor cover 3 cooperate to form a hand grip of discrete length at the upper end of cleaner 1 for manipulation in the portable hand carried vacuum cleaning operation. In order to accomplish this, motor cover 3 is substantially Z-shaped so that a recessed portion 7 is formed to provide a hand hold space 8 between handle 6 and cover 3 when handle 6 is in its closed position.

Nozzle 5 may comprise a conventional nozzle as shown in FIG. 2 having wheels for movably supporting vacuum cleaner 1 on a floor surface. The nozzle may also include conventional rotating or reciprocating brushes (not shown) for facilitating the removable of dirt and other material in the vacuum cleaning operation. As shown in FIG. 1, a conventional flexible hose 9 may be attached to the lower end of vacuum cleaner 1 to which in turn nozzle 5 may be connected so that vacuum cleaner 1 may be placed on the floor or other supporting surface while a user merely manipulates nozzle 5 to clean furniture, upholstery or the like.

In operation, dirt is picked up by nozzle 5 and drawn through hose 9, if used, and then through a suction inlet tube 10 integrally attached to the lower end of body 2. The suction force is produced by air drawn through inlet 10 by means of a fan driven by a suitable electric motor housed within the upper end of body 2 and enclosed by cover 3. The electric motor receives electricity through a conventional power cord 11 which enters body 2 through the upper end of cover 3.

Figure 3:
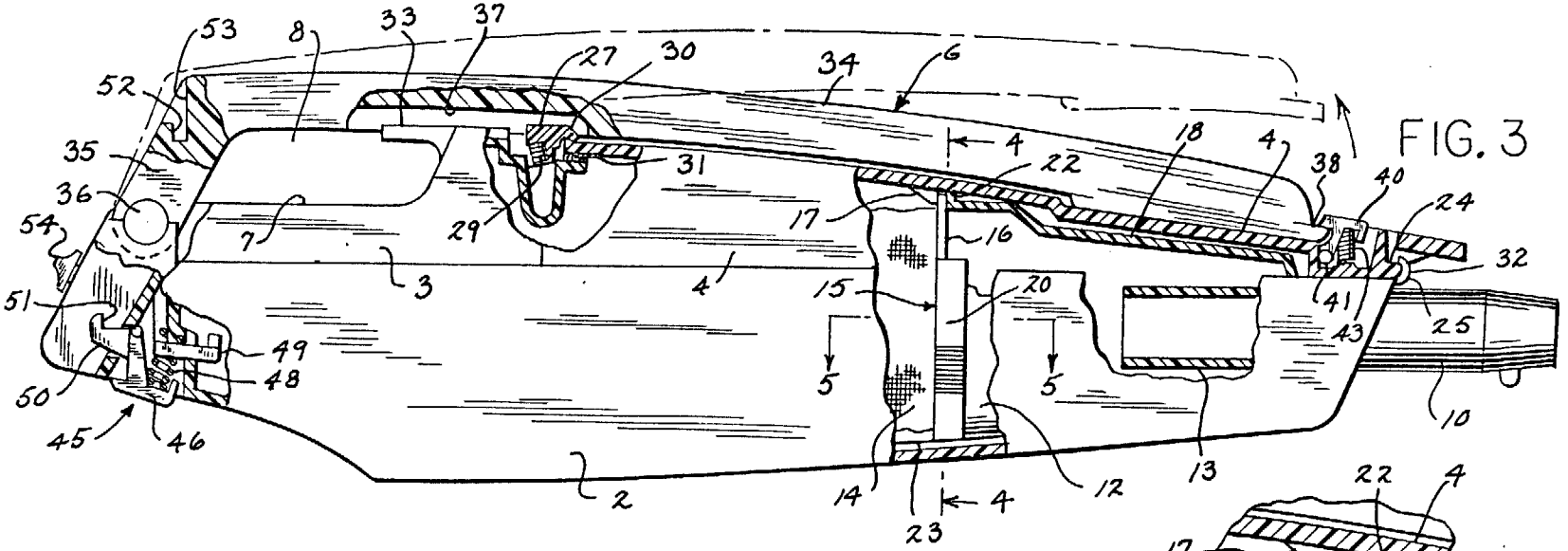
FIG. 3 is an enlarged side view similar to FIG. 1 with parts broken away and in section.
Figure 6:
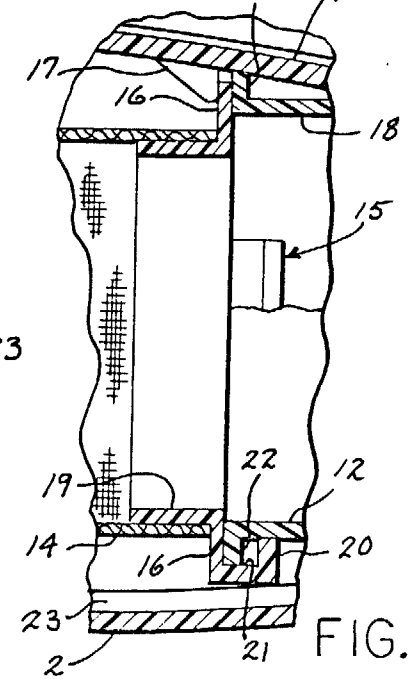
FIG. 6 is a fragmentary side view in section illustrating on an enlarged scale the sealing connection provided for the filter bag frame on the dirt reservoir.
Figure 5:
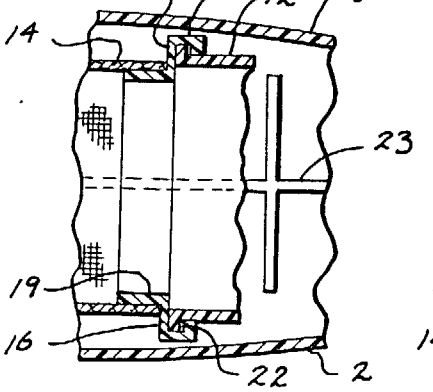
FIG. 5 is a fragmentary plan view in section taken along the plane of the line 5—5 in FIG. 4.
Figure 4:
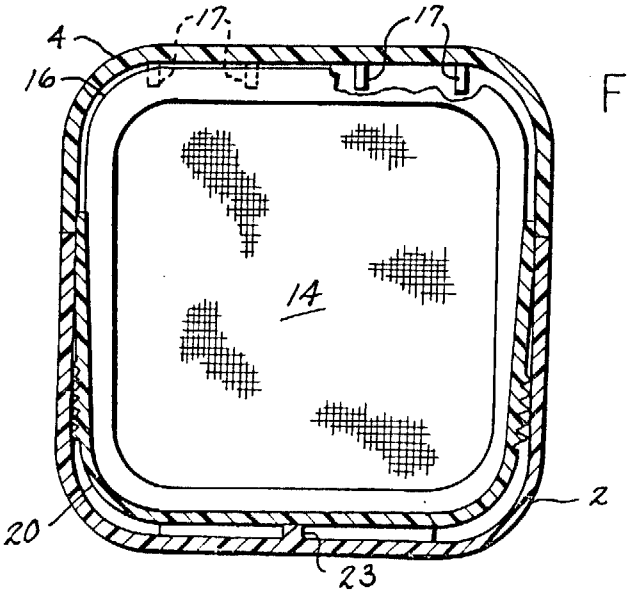
FIG. 4 is an end view in cross section with parts broken away taken along the plane of the line 4—4 in FIG. 3.
Figure 8:
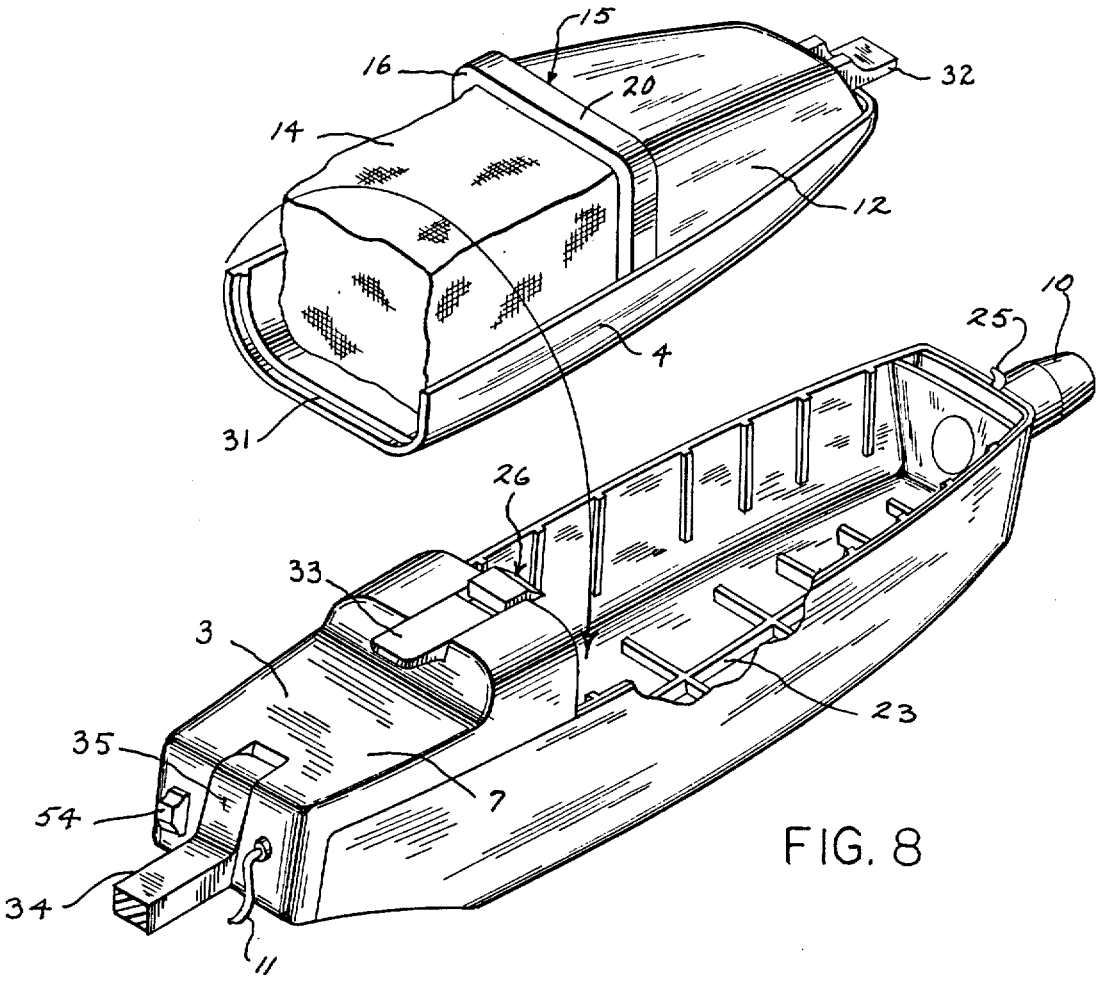
FIG. 8 is a perspective view illustrating the removal and insertion of the dirt reservoir and filter bag assembly on the body of the vacuum cleaner.

Dirt and air are delivered through suction inlet tube 10 to the dirt reservoir and filter bag assembly, which is best shown in FIGS. 3 and 8. The dirt reservoir and filter bag assembly includes cover 4 which as best shown in FIG. 8 is channel or U-shaped and includes a top wall and a pair of opposite downwardly extending side walls. The lip or edge of cover 4 sealingly engages the lip or edge of body 2 and motor cover 3 so as to form an air tight seal when cover 4 is assembled on body 2. The dirt reservoir and filter bag assembly also includes a U-shaped container or reservoir 12 which includes a bottom wall and a pair of opposite side walls which interconnect the bottom wall with the top wall of cover 4. Thus, the side walls of cover 4 lie adjacent the side walls of reservoir 12 to form a ledge as shown best in FIG. 8. Reservoir 12 includes a tubular member 13 therein which is open at its opposite ends so that one end matingly engages suction inlet tube 10 when cover 4 is assembled on body 2 and reservoir 12 projects into the hollow portion of body 2. The opposite end of tube 13 opens to the interior of a filter bag 14 which is connected to a frame 15 which in turn is slidably mounted on the front of reservoir 12. Bag 14 is composed of any suitable woven material which is permeable to enable air to be drawn therethrough and dirt to be deposited thereon. As shown best in FIGS. 3–6, frame 15 includes a rectangular shaped flat frame member 16 which is abuttable against the front edge of reservoir 12 in sealing engagement therewith. As a means for holding frame member 16 against the front edge of reservoir 12 in an air tight relationship, cover 4 includes four spaced apart downwardly extending projections 17. As shown best in FIG. 3, reservoir 12 includes a wall 18 disposed adjacent cover 4 having its front edge spaced from projections 17 a distance substantially equal to the thickness of frame member 16, as shown best in FIG. 6.

Frame member 16 also includes a rectangular flange member 19 projecting toward the upper end of body 2 to which the filter bag 14 is attached, as by adhesives or any other conventional manner. Frame member 16 also includes an L-shaped member 20 projecting toward the lower end of body 2 which forms a channel 21 for slidably receiving the front edge of reservoir 12. As shown best in FIG. 3, member 20 extends only about one-half to two-thirds of distance of frame member 16. As shown best in FIG. 6, the front edge of reservoir 12 includes a flange 22 which projects into channel 21 and flange 22 together with member 20 are held in air tight relationship by means of the longitudinal abutment or rib member 23 extending within the hollow portion of body 2 as shown best in FIGS. 4 and 6, rib member 23 engages member 20 when reservoir 12 and filter bag 14 are inserted within the hollow portion of body 2 to force flange 22 and member 20 into an air tight relationship to provide an air tight seal for frame member 16 along its bottom edge. Thus, frame 15 is held in an air tight relationship on the front of reservoir 12 when cover 4 is latched on body 2.

Figure 9:
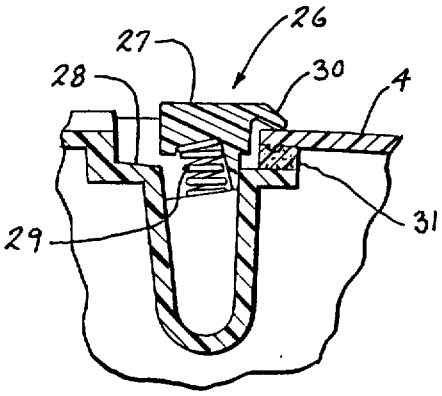
FIG. 9 is a fragmentary detailed view in cross section illustrating the latch for holding the dirt reservoir and filter bag assembly on the cleaner body.

Cover 4 along with reservoir 12 and filter bag 14 are held within the hollow portion of body 2 at one end by a rounded projection 24 integrally formed on the lower end of cover 4 which freely pivotally engages a hook member 25 projecting from the edge of body 2 at its lower end adjacent inlet tube 10. The opposite end of cover 4 is secured by means of a latch 26 which, as shown best in FIGS. 3 and 9 includes a latch member 27 pivotally mounted on cover 3 and located within a notch 28 formed therein. Latch member 27 is biased to its latching position by means of a spring 29 and includes a lip 30 which overlaps and engages the edge of cover 4 as shown best in FIG. 9. The edge of cover 4 also includes a seal 31 along its edge which may be made of rubber or urethane which enhances the air tight relationship between cover 4 and motor cover 3. Thus, cover 4 is latched on body 2 by first inserting rounded projection 24 against hook member 25 and pivoting its upper end downwardly past lip 30 to automatically lock cover 4 in place.

Referring now to FIGS. 2 and 3, there is shown a tab 32 at the lower end of cleaner 1 and a tab 33 at the upper end of cleaner 1. Tab 32 is intergrally formed with rounded projection 24 and is thus part of cover 4 whereas tab 33 projects into hand hold space 8 from motor cover 3. Tabs 32 and 33 provide means for storing power cord 11 when not in use by wrapping cord 11 therearound.

Figure 10:
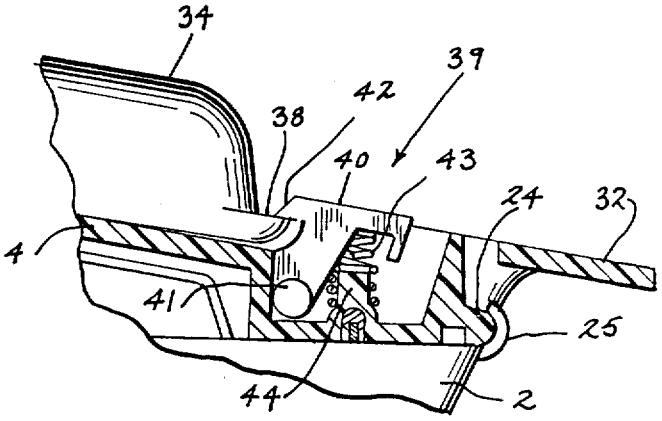
FIG. 10 is a fragmentary detailed view in cross section illustrating the latch for locking the handle of the vacuum cleaner in its closed position.

As shown best in FIG. 3, handle 6 includes a longitudinal portion 34 and an offset portion 35 which is pivotally connected to the upper end of body 2 by pin 36. When closed, the longitudinal portion 34 of handle 6 is held in substantially abutting relationship against cover 4. Portion 34 also includes a recess 37 which permits clearance for latch member 27. The free end of portion 34 includes a lip 38 which cooperates with a latch 39 which acts to automatically lock handle 6 in its closed position. As shown best in FIG. 10, latch 39 includes a latch member 40 pivotally connected, as at 41 to cover 4. Latch member 40 includes a projection 42 for engagement with lip 30 to hold handle 6 in its closed position. A spring 43 biases latch member 40 in a counterclockwise latching position as shown in FIG. 10. Spring 43 is friction fit about a projecting seat 44 to maintain its proper position as shown in FIG. 10. Thus, when handle 6 is being closed the beveled edge of lip 38 slides against the beveled edge of projection 42 forcing latch member 40 clockwise until the point of lip 38 passes the point of projection 42 so that spring 43 forces latch member 40 to the left or counterclockwise to automatically lock handle 6 in its closed position.

Figure 7:
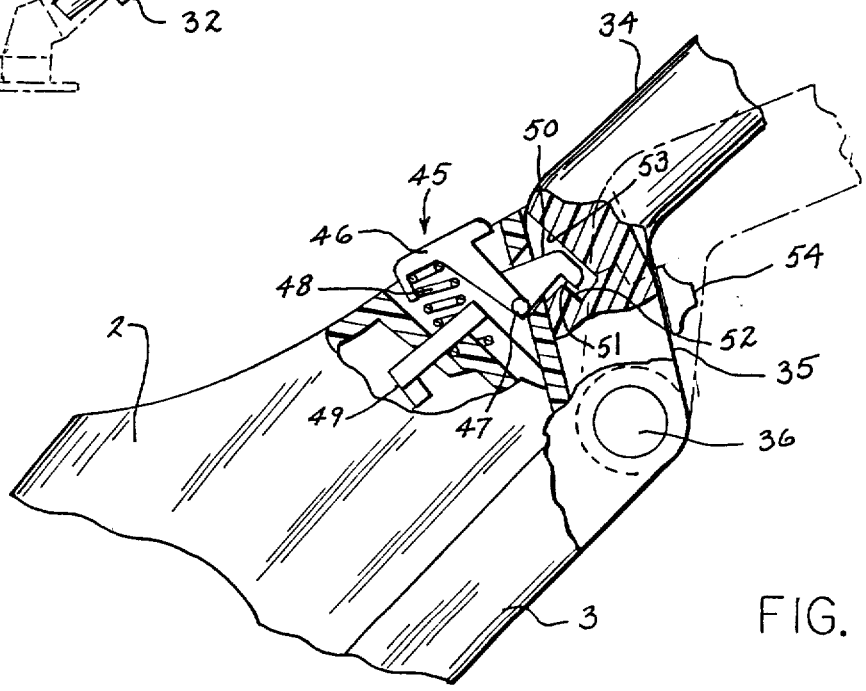
FIG. 7 is a fragmentary side view with parts broken away and in section illustrating the breakaway latch for automatically locking the handle in its open extended position.

As shown best in FIGS. 3 and 7, handle 6 pivots about pin 36 which defines an axis transverse to the longitudinal axis defined by the opposite ends of body 2 and moves in a plane extending through the longitudinal axis. A latch 45 disposed at the upper end of body 2 is employed to automatically lock handle 6 in its open position. As shown best in FIGS. 3 and 7, latch 45 includes a latch member 46 pivotally mounted as at 47 on body 2. Latch member 46 is biased in a clockwise direction as shown in FIG. 7 by a spring 48 one end of which engages the underside of latch member 46 and the other end of which is secured on a land 49 projecting from body 2. A hook member 50 is integrally attached to latch member 46 and includes an abutment surface 51 engageable with a corresponding abutment surface 52 in a recess 53 formed in offset portion 35 of handle 36. Thus, as handle 6 is moved toward its open position, recess 53 engages the beveled portion of hook member 50 forcing latch member 46 in a counterclockwise direction until spring 48 forces abutment surface 51 to be engaged with abutment surface 52. Latch 45 is what may be termed a "breakaway" latch which means that latch 45 normally restrains handle 6 from pivotal movement out of its open position but will allow pivotal movement upon the application of a predetermined external bending force on handle 6. The amount of bending force necessry to cause the latch to "breakaway" is determined by the force of spring 48.

Control of the operation of electric motor within body 2 may be by means of an electric switch 54 which is located on motor cover 3 adjacent the pivotal connection of handle 6 to body 2.

When it is desired to clean reservoir 12 and filter bag 14 of the dirt collected during a cleaning operation, handle 6 must first be pivoted to its open position so that latch 26 may be released. Cover 4 may then be removed along with reservoir 12 and filter bag 14. Filter bag 14 may then be slid off the front of reservoir 12 and cleaned. Also, the dirt collected in reservoir 12 may be deposited in an appropriate disposable container. Filter bag 14 may then be replaced on the front of reservoir 12 and cover 4 maybe reassembled on body 2.

The ability of handle 6 to be disposed selectively in a closed position also facilitates storage of the vacuum cleaner 1 by reducing its overall length to substantially about ½ of its length from that when handle 6 is in its open position.

The invention has been illustrated in connection with the use of a nozzle 12 or combination nozzle 12 and hose 9. However, other suitable nozzles may be attached to the lower end of suction inlet tube 10 as is conventional in the vacuum cleaner art. Thus, for example, in using the vacuum cleaner 1 as a portable unit for cleaning draperies and the like a suitable modified form of nozzle (not shown) which is typically smaller than nozzle 5 may be utilized as desired.

A vacuum cleaner 1 has been illustrated and described which is convertible between an upright vacuum cleaner and a portable hand held vacuum cleaner. The vacuum cleaner construction is extremely simple and economical with numerous elements of the vacuum cleaner structure being readily formed of molded plastic providing its relatively light weight.

Various modes of of carrying out the invention are contemplated as being within the scope of the following claims particularly pointing and distinctly claiming the subject matter which is regarded as the invention.

We claim:

1. A vacuum cleaner convertible between an upright vacuum cleaner and a portable hand carried vacuum cleaner, the combination comprising;

a housing having opposite ends;

nozzle means at one end of said housing;

motor means in said housing for effecting suction of air through said nozzle means;

filter means in said housing for receiving air from said nozzle means and arranged to remove and collect dirt from the air;

a handle pivotably mounted on the other end of said housing for selective movement between an open position extending from said housing for manipulation thereof in an upright floor carried vacuum cleaning operation, and a closed position overlying said housing wherein said handle and housing cooperate to form a hand grip of discrete length at a location remote from said nozzle means adjacent said other end for manipulation thereof in a portable hand carried vacuum cleaning operation; and handle locking means for automatically locking said handle in its open positioon upon movement thereto.

2. The vacuum cleaner of claim 1, wherein said housing includes a recess at said other end to provide a hand-hold space between said handle and said housing for said grip when said handle is in its closed position.

3. The vacuum cleaner of claim 2, further including handle fastening means on said housing for fastening said handle in its closed position so that the length of said handle between its free end and said recess is held in a substantially abutting relationship against said housing.

4. The vacuum cleaner of claim 1, wherein said housing includes a pair of opposite spaced apart longitudinal side walls extending between said opposite ends, and said handle pivots about an axis transverse to said side walls.

5. The vacuum cleaner of claim 1, wherein said automatic handle locking means includes means normally restraining the handle from pivotal movement out of its open position except upon the application of a predetermined external bending force on said handle.

6. A vacuum cleaner convertible between an upright vacuum cleaner and a portable hand carried vacuum cleaner, the combination comprising:

a housing having opposite ends;

nozzle means at one end of said housing;

motor means in said housing for effecting suction of air through said nozzle means;

filter means in said housing for receiving air from said nozzle means and arranged to remove and collect dirt from the air, said filter means includes a removable dirt reservoir carried by said housing disposed between said nozzle means and said motor means, and a filter bag carried by said dirt reservoir disposed between said reservoir and said motor means; and a handle pivotably mounted on the other end of said housing for selective movement between an open position extending from said housing for manipulation thereof in an upright floor carried vacuum cleaning operation, and a closed position overlying said housing wherein said handle and housing cooperate to form a hand grip of discrete length at a location remote from said nozzle means adjacent said other end for manipulation thereof in a portable hand carried vacuum cleaning operation, and wherein said dirt reservoir includes handle latching means thereon for latching said handle in its closed position.

7. A vacuum cleaner convertible between an upright vacuum cleaner and a portable hand carried vacuum cleaner, the combination comprising;

a housing having opposite ends;

nozzle means at one end of said housing;

motor means in said housing for effecting suction of air through said nozzle means;

filter means in said housing for receiving air from said nozzle means and arranged to remove and collect dirt from the air, said filter means includes a removable dirt reservoir carried by said housing disposed between said nozzle means and said motor means, and a filter bag carried by said dirt reservoir disposed between said reservoir and said motor means, and said housing includes a hollow portion extending between said motor means and said nozzle means, said dirt reservoir includes a cover closing said hollow portion, and said housing futher includes a bottom wall and side walls interconnecting said cover and bottom walls;

a handle pivotably mounted on the other end of said housing for selective movement between an open position extending from said housing for manipulation thereof in an upright floor carried vacuum cleaning operation, and a closed position overlying said housing wherein said handle and housing cooperate to form a hand grip of discrete length at a location remote from said nozzle means adjacent said other end for manipulation thereof in a portable hand carried vacuum cleaning operation;

latching means on said housing for removably latching said cover thereto in air tight relationship therewith; and mounting means for removably mounting said filter bag on said dirt reservoir, and mounting means includes a frame carrying said filter bag, a flange formed on said bottom and side walls, a groove on said frame for slidably receiving said flange, and means for holding said filter bag frame in air tight relationship in said reservoir.

8. The vacuum cleaner of claim 7, wherein said holding means includes projection means on said cover engageable with said filter bag frame to hold said frame against said reservoir.

9. The vacuum cleaner of claim 8, wherein said holding means further includes abutment means within the hollow portion of said housing engageable with said filter bag frame to hold said flange against said groove.

*10. A vacuum cleaner convertible between an upright vacuum cleaner and a portable hand-carried vacuum cleaner comprising:*

*housing for vacuum components;*

*said housing having opposite ends, a first side surface and a second opposite side surface;*

*said vacuum components including a vacuum nozzle opening at one end of said housing, a motor having means for effecting suction of air through said vacuum nozzle, and a filter for receiving air from said vacuum nozzle and arranged to remove and collect dirt from the air;*

*a handle pivotally mounted on the other end of said housing for selective movement between an open position extending from said housing means for manipulation thereof in an upright floor carried vacuum cleaning operation, and a closed position overlying said first side surface of said housing, said handle closely overlying said first side surface of said housing throughout substantially the entire length of said handle to create a compact visual appearance, said first side surface of said housing deviating downwardly away from said handle for only a sufficient portion of the length of said handle to define a hand-hold recess below said handle whereby a user can readily grasp said handle in said hand-hold area when said handle is in said closed position for manipulation thereof in a portable hand-carried vacuum cleaning operation; and*

*handle locking means for locking said handle in its open position upon movement thereto.*

*11. The vacuum cleaner of claim 10, further including handle fastening means on said housing for fastening said handle in its closed position so that the length of said handle between its free end and said recess is held in a substantially abutting relationship against said housing means.*

*12. The vacuum cleaner of claim 10 wherein said handle locking means includes means for normally restraining the handle from pivotal movement out of its open position except upon the application of a predetermined external bending force on said handle.*

*13. A vacuum cleaner convertible between an upright vacuum cleaner and a portable hand-carried vacuum cleaner, a combination comprising:*

*housing for vacuum components;*

*said housing having opposite ends;*

*said vacuum components including a vacuum nozzle opening at one end of said housing means, a motor and motor driven fan for effecting suction of air through said vacuum nozzle, and a filter for receiving air from said vacuum nozzle and arranged to remove and collect dirt from the air;*

*a handle pivotally mounted on the other end of said housing for selective movement between an open position extending from said housing for manipulation thereof in an upright floor carried vacuum cleaning operation, and a closed position overlying said housing for manipulation thereof in a portable hand-carried vacuum cleaning operation;*

*handle locking means for automatically locking said handle in its open position upon movement thereto; and*

*handle fastening means for automatically locking said handle in its closed portion upon movement thereto.*

* * * * *

UNITED STATES PATENT AND TRADEMARK OFFICE

CERTIFICATE OF CORRECTION

PATENT NO. : Re. 32,751

DATED : September 20, 1988

INVENTOR(S) : Michael S. Joss and David E. McDowell

It is certified that error appears in the above-identified patent and that said Letters Patent is hereby corrected as shown below:

Column 6, Line 32:

"necessry" should be --necessary--

Column 7, Line 27, Claim 1:

"positioon" should be --position--

Column 10, Line 26, Claim 16:

"portion" should be --position--

Signed and Sealed this

Eighteenth Day of April, 1989

*Attest:*

*Attesting Officer*

DONALD J. QUIGG

*Commissioner of Patents and Trademarks*